(12) United States Patent
Buchanan (10) Patent No.: US 8,813,684 B2
(45) Date of Patent: Aug. 26, 2014

(54) SOLID WALL CLOSED CONTAINMENT AQUACULTURE SYSTEM

(75) Inventor: Richard Buchanan, Burnaby (CA)

(73) Assignee: Agrimarine Industries Inc., Vancouver, BC (CA)

( * ) Notice: Subject to any disclaimer, the term of this patent is extended or adjusted under 35 U.S.C. 154(b) by 216 days.

(21) Appl. No.: 13/254,840

(22) PCT Filed: Mar. 3, 2009

(86) PCT No.: PCT/CA2009/000269
§ 371 (c)(1),
(2), (4) Date: Sep. 3, 2011

(87) PCT Pub. No.: WO2010/099590
PCT Pub. Date: Sep. 10, 2010

(65) Prior Publication Data
US 2011/0308473 A1    Dec. 22, 2011

(51) Int. Cl.
*A01K 63/04* (2006.01)
*A01K 61/00* (2006.01)

(52) U.S. Cl.
CPC .............. *A01K 61/007* (2013.01); *A01K 61/003* (2013.01); *A01K 63/04* (2013.01)
USPC .......................................... 119/223; 119/226

(58) Field of Classification Search
USPC ................................................ 119/223–229
See application file for complete search history.

(56) References Cited

U.S. PATENT DOCUMENTS

| | | | | |
|---|---|---|---|---|
| D282,998 S | * | 3/1986 | Ransom | D7/584 |
| 4,860,914 A | * | 8/1989 | Derni et al. | 220/4.28 |
| 5,616,239 A | * | 4/1997 | Wendell et al. | 210/86 |
| 5,762,024 A | * | 6/1998 | Meilahn | 119/223 |
| 6,003,164 A | * | 12/1999 | Leaders | 4/507 |
| 6,739,469 B1 | * | 5/2004 | Kim | 220/4.12 |
| 7,284,501 B2 | * | 10/2007 | Page | 119/223 |
| 8,365,937 B2 | * | 2/2013 | Lovelace et al. | 220/4.17 |
| 8,371,245 B2 | * | 2/2013 | Papadoyianis et al. | 119/223 |
| 2006/0162667 A1 | * | 7/2006 | Papadoyianis et al. | 119/223 |

* cited by examiner

*Primary Examiner* — Rob Swiatek
*Assistant Examiner* — Ebony Evans (57) ABSTRACT

This system for cultivating marine species employs a marine-based array of floating closed-containment tanks composed of panels made of waterproof fiberglass laminate materials and internal buoyant foam-based materials. The panels, connected by flanged struts, form the walls and bottom of the tanks, which are substantially cylindrical in overall shape. The tops of the tanks are open to the atmosphere but are protected from predators via a thick mesh top net. The system also employs a filtration system which utilizes centrifugal water flow and hydraulics to remove sludge and solid matter which is then filtered and transformed into a component for use in garden fertilizers. It also uses an electronic computerized system for monitoring and controlling the marine species rearing environment.

10 Claims, 10 Drawing Sheets

SOLID WALL CLOSED CONTAINMENT AQUACULTURE SYSTEM

FIELD OF THE INVENTION

This invention relates generally to aquaculture, but more specifically to floating solid wall closed containment tanks for the rearing and husbandry of aquatic species, for example, finfish.

BACKGROUND OF THE INVENTION

Finfish aquaculture has become prominent ever since natural finfish stocks have begun to be depleted due to overfishing. Data from Marine Biologist Boris Worm, at Dalhousie University in Halifax, Canada, indicates that "by the middle of this century, fishermen will have nothing left to catch." [Source: "Ocean's of Nothing", page 101, Time Magazine, Nov. 13, 2006]. As a result, aquaculture is now "the fastest growing agri-food industry in the world" and is expected to outpace commercial fish landing by 2030 [Source: "Fin-fish Farming in British Columbia (2005)" BC Chamber of Commerce]. Lagging behind in this rapid growth industry is environmentally sustainable technology, which is now only beginning to develop. Open-net ocean-based pens are most common today, an example being the system featured in U.S. Pat. No. 7,284,501 which involves a containment pen composed of removable net panels. Systems such as these are often criticized by environmentalists for fostering disease and sea lice among finfish populations. There are also problems with escapes and with the passage of other pathogens and antibiotics into the marine ecosystem.

Sea lice are crustacean parasites, which attach themselves onto farmed and wild salmon. While sea lice do not directly kill fish, as parasites they draw down the fish's resources and decrease fitness, rendering them less viable. Sea lice also create open lesions on fish, which can lead to infection and can interfere with the fish's salt-water balance. The harm from sea lice is generally not fatal to adult fish, but increases mortality among juvenile salmon. Full-grown sea lice are a significant size and weight in comparison to smolt-size salmon, and can impede the smolt's ability to swim. Sea lice bred inadvertently in large numbers in farm salmon are viewed by environmental groups and some governments as a threat to wild salmon populations.

There is also the problem of escapes. Salmon farming on the west coast of North America is currently conducted in open net-pens in the marine environment. Farmed salmon can escape from their holding facilities and survive in the wild. The concern is that escaped salmon may reproduce and compete for spawning space and food with wild salmon.

Because net pens are open to ocean waters, pollution from salmon farms is discharged directly into the ocean. Waste from fish farms may include feces, uneaten food pellets, dead fish, antifoulants used on nets to reduce marine growth, disinfectants, and trace amounts of other materials used at fish farm sites.

These and other environmental concerns have led some state governments or provincial governments, such as those of Alaska and British Columbia to restrict or place moratoriums on salmon farming, particularly with open-net pens. These increasing environmental regulations and increasing consumer awareness have led to the development of a few land based aquaculture systems.

Land-based aquaculture systems are generally small in scale, but are expensive to build and operate due to the use of costly real estate, the cost of energy to pump water and the collateral costs and impact regarding existing sewage and waste management. One example of such a system is found in U.S. Pat. No. 5,014,647 which has a number of small fish tanks or silos connected to a pump by piping through which water is withdrawn from the tops of the silos by gravity and then delivered by a pump to the bottoms of the silos. Systems such as U.S. Pat. No. 5,014,647 are small scale and land based and they tend to have high unit production costs. The size of land based systems is also limited, due to the fact that large heavy tanks may collapse under their own weight. They also lack the buoyant material construction and the cost advantages of the marine based aquaculture systems and it is difficult to provide an adequate amount of exercise for the fish in such restricted environments.

With marine based closed-tank systems, the material used is an important consideration. Most marine based systems in commercial operation today that do not use open net-pen systems, use synthetic or metallic materials such as heavy gauge plastic or aluminum in their container construction. This results in problems with structural integrity, corrosion, resulting in short life and costly maintenance of such systems. Additionally, the inside surface of the tank must be composed of a material which should be USDA approved as being food-safe.

In terms of construction, there are three main types of fish tanks: raceway, D-ended, and rounded. These tanks are described below:

Raceway is a general term given to a straight sided artificial channel in which fish are held. Generally these have a high water turnover rate, occurring in less than one hour. The advantages of raceways are that they can be easily built in series, with the water flowing from one to the other and that they are easy to empty of fish by using a simple crowding screen. To be self cleaning, raceways must be operated at high flow rates and/or high stocking densities, where the movements of the fish keep feces and uneaten feed from settling. Disadvantages of raceways relate primarily to poor mixing, and include the gradual deterioration of the water quality along the length of the raceway (whereas round tanks tend to be more even). Difficulty in efficient distribution of additional oxygen throughout the raceway can prove to be another disadvantage. Raceways are usually built with a width to depth ratio of between 2:1 and 4:1, with the length limited either by the amount of fish that can be held in a single holding unit or the deterioration of water quality. The even nature of raceways means that they are somewhat flexible, allowing screens to be placed anywhere along the length of the raceway, thus dividing a single unit into 2 or more smaller units. Modifications to the designs include rounded bottoms to concentrate solids for ease of cleaning by vacuuming—especially where small fish are involved. Aeration along the length of the raceway may also be included, which serves to maintain more even oxygen concentrations along the length of the raceway, and also concentrates settled solids into specific areas to make cleaning easier. Other modifications include the addition of barriers in the raceway to create a swirling motion in the water where waste concentrates. Raceways are advantageous in that they can be constructed with basic building materials such as bricks, blocks or poured concrete and require little specialized labour.

D-ended raceways tanks are preferable for land based applications as they are very economical in terms of space. These tanks can be constructed from most materials, including fiberglass and concrete. They enable a lower tank turnover time, without compromising velocity rates and self cleaning abilities. Inlet pipes and aeration/oxygenation devices are positioned to create the desired water velocity rate. D-ended tanks are useful in situations where space and make up water are limited.

Round or cylindrical tanks have the advantage of a naturally self cleaning action. Circular motion of water within the tank induces a secondary toroidal flow, which sweeps wastes toward the center drain. Due to this property, they are often used in hatcheries, where due to high feed rates, solids loadings (waste feed and feces) can be very high and also in re-circulation systems, to remove the unwanted solids as soon as possible, before they break down. Round tanks can be constructed of almost any material, the most common being fiberglass (for tanks 8 m diameter and under), steel (lined or unlined) and concrete or concrete block. Other materials can be used as long as it is strong enough to hold the water without distortion and is non-corrosive, non-abrasive and non-toxic. Round tanks generally have a slope on the bottom towards the center outlet to increase solids removal efficiency. Other qualities of round tanks include: a good mixing of the water, resulting in easy oxygenation; and less contact of the fish with the tank sides and bottom, due to a higher ratio of tank volume:tank wall and bottom. Many species prefer the consistent current of a round tank to other systems. Rounded tanks are ideal for marine usage because there is less constraint on their size in such environments as even relatively large round tanks can be stable in the water.

OBJECTIVES OF THE INVENTION

Growing environmental concerns over open net pens, the waste they produce, biological contaminants, sea lice, their overall effects on wild salmon populations and contamination of the marine environments have led to the need for aquatic rearing environments which are separated from natural fish populations.

Existing land based systems require expensive real estate and are not as commercially feasible as ocean based systems. They are also structurally limited in terms of their scale. Ocean based systems with metallic construction are also problematic, due to inevitable corrosion. There is thus a commercial need for new non-corroding ocean based closed-containment systems for the rearing of marine species such as finfish. Such a system must also provide sufficient space, water flow, and oxygen to keep the species in a healthy condition. It is an object of the present invention to resist corrosion and provide the above described conditions for the aquatic creatures.

Water-based closed-containment fish tank systems also need to be structurally strong enough to withstand, currents, wave action, and point loads exerted by moorings. It is a further object of the invention to provide at tank which is structurally strong enough to withstand these forces.

Another object of the present invention is to provide a tank of sufficient buoyancy that it does not require extensive structural supports to maintain its position at the water surface. The tanks must thus be buoyant, strong, and resistant to corrosion, while at the same time providing excellent conditions for the fish in terms of space, water flow, water oxygenation and good fish hygiene.

SUMMARY OF THE INVENTION

The system comprises an array of floating tanks, each of which is of near cylindrical shape, composed of laminate material arranged into panels having waterproof fiberglass external layers and foam internal layers for buoyancy. The tanks are supplied with water via intakes that are integral with the tank wall at 2-3 locations depending on the size of the tank, with oxygen supplied through dispersion technology, and power supply system which comprise a connection to the power grid, backup diesel power generators, and a primary oxygen supply system complete with liquid oxygen backup tanks.

The laminate panels form the walls and lower surface of the tanks while the top of each tank is open to the atmosphere, but is protected from predators via a densely hewn net. The panels are near rectangular in shape and connected by flanged struts which run vertically parallel to the panels. The flanged struts are composed of a laminate material and can be similar to that of which the panels are formed. Each flanged strut connects two adjacent panels which are arranged in a circle around the edge of each tank. The bottom portion of each panel is curved inward toward the bottom of the tank where it becomes triangular. This cylindrical shape in conjunction with the flanged struts provides structural strength as the outside water pressing against the panels pushes them together.

On the sides of each tank, attached to two side panels along the upper rim are two water pumps which circulate water centrifugally within the tank. At the center of the bottom of each tank is a cylindrical waste trap into which solid waste and sludge material settles with the aid of hydraulic action, and is then pumped through an outlet pipe to the surface by a lift pump into a waste filtration system.

In one embodiment of the invention, the wastewater flows through the inlet tube, and is filtered through a wire cloth filter screen along a looping conveyor system where the solid materials and sludge are removed. Filtered water from the back of the wire cloth flows out through the outlet pipe. The wire cloth rotates and transports the separated solid matter and sludge to an air cleaning device. At the end of the screen the solid matter and sludge falls down into a storage compartment for removal. At this stage the sludge is rich in nutrients such as nitrogen and phosphorous and is suitable for use as a component ingredient in garden fertilizers.

In another embodiment of the system, the wastewater is directed to a gravity thickener, of a design known in the art. Clear overflow, containing dissolved ammonia and phosphate, is treated using known methods such as disclosed in U.S. patent application 20080257826 to Koch et al, while the underflow is directed to a solid bowl centrifuge. The clear centrate is combined with the thickener overflow stream. The cake is suitable for use as fertilizer.

The above process uses an automated fish and rearing environment monitoring system, that is computerized to receive information about water flow, temperature, and quality using sensors and electronic controls in combination with computers.

In order to provide an optimal rearing environment for finfish, the biological design of the tank must take into consideration the maximum allowable stocking density, the required water flow, and the required tangential water velocities. Maximum allowable stocking density is an empirical value which primarily affects fish life support. Required water flow is firstly a function of oxygen demand of the fish, secondly a function of the need to flush ammonia produced by the fish and thirdly a function of the need to remove solid wastes. Fish swimming activity is a function of the angular velocity of the water in the tank.

In a preferred embodiment, the dimensions of the tank are as follows:
Tank radius at waterline=15.227 m
Tank perimeter at waterline=95.676 m
Tank water plane area=728.443 m^2
Maximum tank depth=8.471 m Slope of tank bottom=12.5%
Depth at top of corner section of tank=6.567 m
Depth of bottom cone section of tank=1.903 m
Depth at bottom corner of tank=6.567 m
Underflow:
Underflow radius=1.524 m
Underflow perimeter=2(Pi)*1.524 m
Underflow area=7.297 m^2
Approximate volume of tank=Pi(rp)^2*(dfct+dfc/2)=5477 m^3
Approximate area of tank=1362 m^2
Approximate depth of tank=zf−dfc*r/rp=6.567 m
The pump specifications are as follows:
Maximum discharge required=50000 L/min
Allowable pump head=0.15 m
Maximum final tank flow=100000 L/min
Fraction of flow at underflow=1000 L/min
Density Effects:
If we know the temperature and salinity of the water inside and outside the tank we can estimate the water densities, buoyancy requirement and the density head, for example:
Temperature inside:=13
Salinity inside:=3C
Temperature outside:=13
Salinity outside:=3C
The following empirical relationships are developed from Wheaton, 1977, pg. 42, Aquacultural Engineering, Krieger based on data from the Handbook of Chemistry and Physics:
A temperature correction factor:=(1−7.737*10^(−3)*T/35)
A salinity correction factor:=31.5*S/40
Inside water density=1021 kg/m^3
Outside water density=1021 kg/m^3
From Solaas we see that under static conditions the relative head difference due to density between the outside and inside water levels will be:

$$Zp := (1 - p_{inside}/p_{outside}) * zf = 0 \text{ m}$$

This difference in head between the inside and outside is that at which no net flow at the underflow should occur.
Note the implicit assumption of uniformity in vertical density distribution of both water columns.
Viscosity Effects:
Absolute Viscosity=1.3 N*s/m^2

$$\text{Kinematics Viscosity} = \text{absolute viscosity/inside density}$$
$$= 1.274 \times 10^{\wedge}(-3) \text{ m}^{\wedge}2/s$$

Biological Design:
The tank volume is 5477.143 cubic meters and the final tank condition at maximum allowable density is as follows:
Final tank stocking density=35 kg/cubic meter
Final tank fish mass=4.5 kg each
Final tank biomass=1.917×10^5 kg
The standard length/weight relationship for finfish of the desired type is:

$$L = (W*R)/G^2$$

Where
L is in inches;
G (girth) is in inches (typically 0.58 L for salmonids)
R equals 750 for trout and 650 for salmon
W is in pounds
This yields a final tank fish length (after converting to metric) of 0.68 m.

Maximum screen size is given by G/(1.5*Pi)=0.58*L/(1.5*Pi)=3.294 in.
Final tank fish number=biomass/mass=42,601
Final tank fish respiration rate=100 ((mg/hr)/kg) (estimated for active fish behavior)
Choosing an available oxygen value (difference between inlet and outlet water in the tank):
Inlet oxygen concentration=8.0 mg/L
Outlet O2 concentration=6 mg/L
Available oxygen=O2in−O2out=2 mg/L
Oxygen Supplementation:
Air Separation System:

$$O2sep = biomass*repiration - available\ oxygen*(maximum\ flow)$$

$$O2sep = 1.992 \times 10^{\wedge}(-3) \text{ kg/second}$$

Estimating flow for the initial stocking condition with small fish:
Initial fish weight=300 gm
Initial length=0.276 m
Initial fine screen size=1.336 inches
Initial biomass=1.278×10^4 kg
Initial tank density=Initial biomass/Volume=2.333 kg/cubic meter
Initial fish respiration=350 mg/hr/kg $$\text{Maximum initial tank flow} = (\text{initial biomass} * \text{initial respiration})/\text{available oxygen}$$
$$= 37,276 \text{ L/min}$$

Swimming Velocities:
Given that the optimal swimming speed for salmon is taken to be 0.5 times the body length per second we can establish the following tangential velocities at the tank radius:

$$V\text{finish} = (0.5 * \text{final fish length})/\text{second} = (0.5 * 68 \text{ m})/s = 0.34 \text{ m/s}$$

$$V\text{initial} = (0.5 * \text{initial length})/\text{second} = 0.138 \text{ m/s}$$

Vortex Calculations:
Assuming inlet headloss: Hinlet:=Hpump/2 Hinlet=0.075 m
Assuming an inlet headloss coefficient: kin:=2
Assuming an inlet velocity: vinlet:=square root{(Hinlet*2*g)/kin}
vinlet=0.858 m/s
Inlets area: Ainletf:=Qmax/vinlet
Ainlet=1.943 m^2
Inlet depth: Dinlet:=4 m
Number of inlets: ninlets:=2
Inlet width: Winlet:=Ainletf/(ninlets*Dinlet)
Winlet=0.243 m
Inlet Reynolds number: Reinlet:=vinlet*sqrt{(4*Ainletf)/(ninlets*Pi)}/Vsw
Reinlet=748.958
Wall skin friction coefficient: Cs:=0.05
Fluid sheer loss coefficient; Ct:=0.05
Taking the worst case as the final tank at maximum flow we can estimate the vortex characteristics as follows:
Vortex r0 (typically mean r of underflow), where vortex changes from free to forced:
r0:=runder
Overflow Design Maximum overflow velocity: Vover:=(0.5*length)/s
Vover=0.34 m/s
Choosing a head loss coefficient for the overflow screen holes:
Kholes:=5
Headloss through screen: Hover:=(kholes*Vover^2)/2 g
Hover=0.029 m
Overflow screen area Aover:=Qmax/Vover
Aover=4.904 m^2
Main screen hole diameter dhole:=round(screenf/in)in
Dhole=3 in
Area of overflow screen holes: Ahole:=(Pi/4)*dhole^2
Ahole=4.56*10^(−3) m^2
Number of screen holes: nholes:=round(Aover/Ahole)
Nholes=1.075*10^3
Maximum overflow screen depth dover:=1 m
Number of hole rows: nrows:=round((kescreen*dover)/dhole)
nrows=6
Number of hole column: ncol:=round (nholes/nrows)
ncol=179
Overflow length: lover:=(dhole*ncol)/kscreen
lover=30.311 m
Weight cause by overflowhead: Wover:= Awp*Hover*Rinside
Wover=2.19×10^4 kg
Headloss at underflow:
Choosing a head loss coefficient for the tank underflow: kout:=5
Underflow headloss: Hunder:=zdynamic(r0)+Hover (assuming no pumping)
Hunder=0.019 m
Underflow diameter: dunderflow:=6 in
Underflow cross-section area: Aunderflow:=(Pi/4)*dunderflow^2
Aunderflow=0.018 m^2
Underflow velocity: Vunderflow:=Qunder/Aunderflow
Vunderflow=0.914 m/s
Underflow pumping head: Hunderpump:= (kout*vunderflow^2)/2 g−Hunder
Hunderpump=0.194
Total Heads:
Total head facing pump: Hface:=DeltaZp+Zdynamic(rp)+Hinlet+Hover
Hace=0.104 m
Density weight: Wp:=deltaZp*Awp*Rinside*g
Wp=0 N
Dynamic weight: Wdynamic:=Vdynamic*Rinside*g
Wdynamic=−3.986×10^4
Weight on floatation: Wfloat:=Wdynamic+WR+Wover*g
Wfloat=1.749×10^5 N
Wfloat=17.832 tonne*g Essentially the invention provides a solid wall closed-containment system for cultivating aquatic species, comprising floatation panels having a side portion that curves into a bottom portion, fitted between flanged struts and arranged to provide a continuous side wall contiguous with a continuous bottom to separate outside water and organisms from inside water and contained aquatic species. The side portion is curved vertically and forms an arc, such that a plurality of such side portions can be arranged to form a tank that is substantially cylindrical. The "closed containment" means that the aquatic species cannot escape through the water to the ambient marine environment—however the system is open to the air at the top of the system for observation from surrounding walkways above the water within the system. Netting can be suspending to ward off birds of prey.

This arrangement enables water within the containment system to be circulated to form a single donut-shaped vortex. It is preferable to have this type of circulation, rather than dual or multiple vortices within the tank, for species monitoring and for waste management and removal from the bottom drain of the tank.

In a preferred embodiment:

a) the bottom portion is tapered toward a central drain abutment end and has a substantially flat portion, such that a plurality of such bottom portion can be arranged to form a tank having a bottom that is substantially flat and surrounds a drain aperture;

b) the floatation panels comprise floatation layers laminated with waterproof layers;

c) there is additionally a power system, an oxygenation system, a waste removal system, and a computerized husbandry monitoring system, with sensors and electronic controls for water temperature, flow, and quality;

d) the panels and flanged struts form a tank that is substantially cylindrical in shape, with solid sides and bottom, made up of a plurality of side and bottom flotation panels having curved portions between side portions and bottom portions of each flotation panel;

e) there are at least two water pumps which have marine based water intakes, and which circulate water within the tank;

f) the water pumps are mounted at separate locations outside the tank, each of the water pumps having a pump water outlet connected to a flared pipe that is sealed at an acute angle to a tank water inlet window in a side panel of the tank, to circulate water within the tank;

g) there is a waste trap at a central bottom portion of the tank which collects solid matter and sludge for removal to a waste separation system.

DETAILED DESCRIPTION

Figure 1:
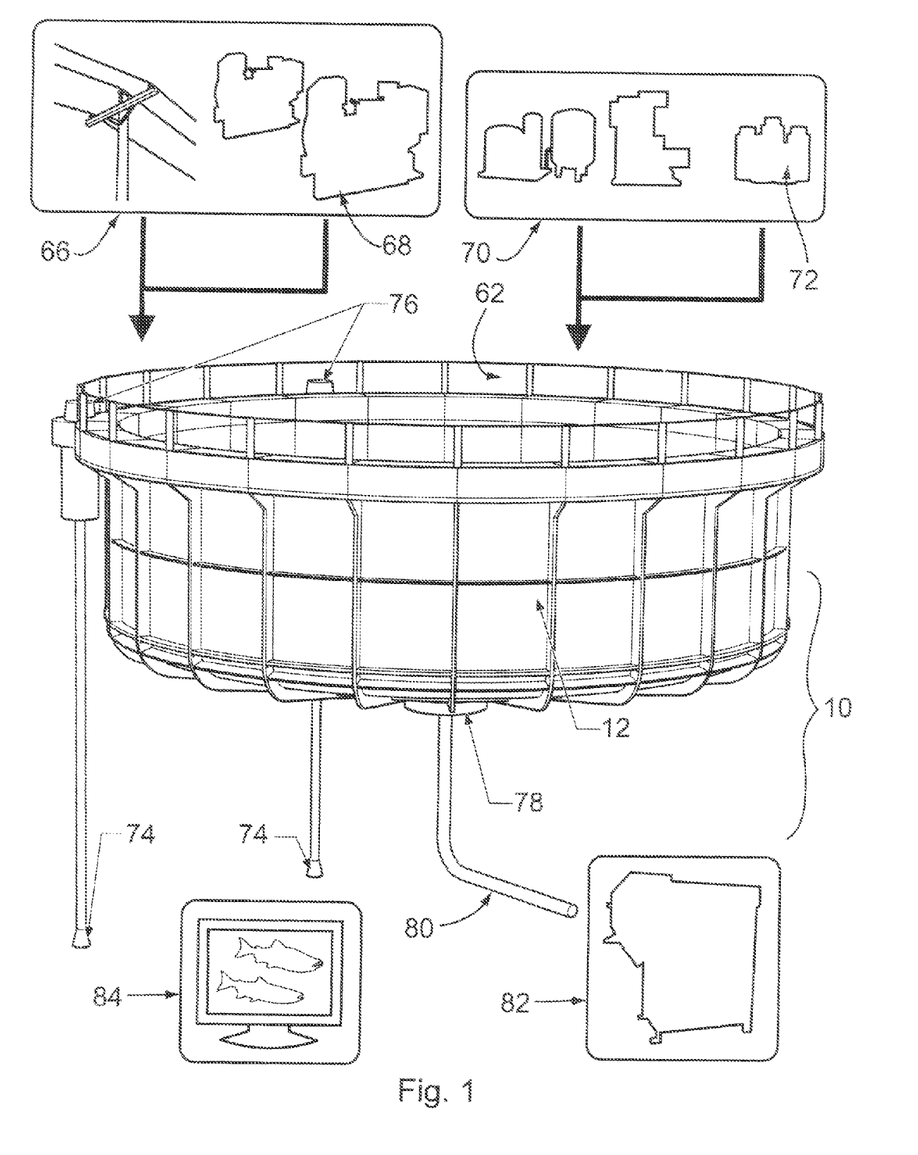
FIG. 1 is a schematic overview of the components of the closed containment fish rearing system, showing a closed containment fish tank in relation to its power supply, oxygen supply, waste and water systems, and fish rearing environment monitoring system.

Referring to FIG. 1 a schematic overview of the components of the closed containment fish rearing system 10 show a closed containment fish tank 12, with water intakes 74, water pumps 76, walkway 62. waste trap 78, waste outlet 80, and waste filtration system 82. An electrical power supply 66 and diesel backup 68 enable the pumping of water for circulation within the tank 12. The water pumps 76 circulate water within the tank to exercise the fish, to provide the proper water conditions regarding temperature, purity, and oxygenation, and to direct debris via vortex action to a waste trap. The water pumps can be adjusted optimally to create a single "donut" vortex of water in combination with the substantially cylindrical shape of the tank above its bottom. An oxygen supply 70 and a liquid oxygen backup 72 enable enhanced oxygenation of the water for the benefit of the fish to be reared. An electronic monitoring system A monitoring system 84 is used to display fish and water condition information received from sensors in the water.

Figure 2:
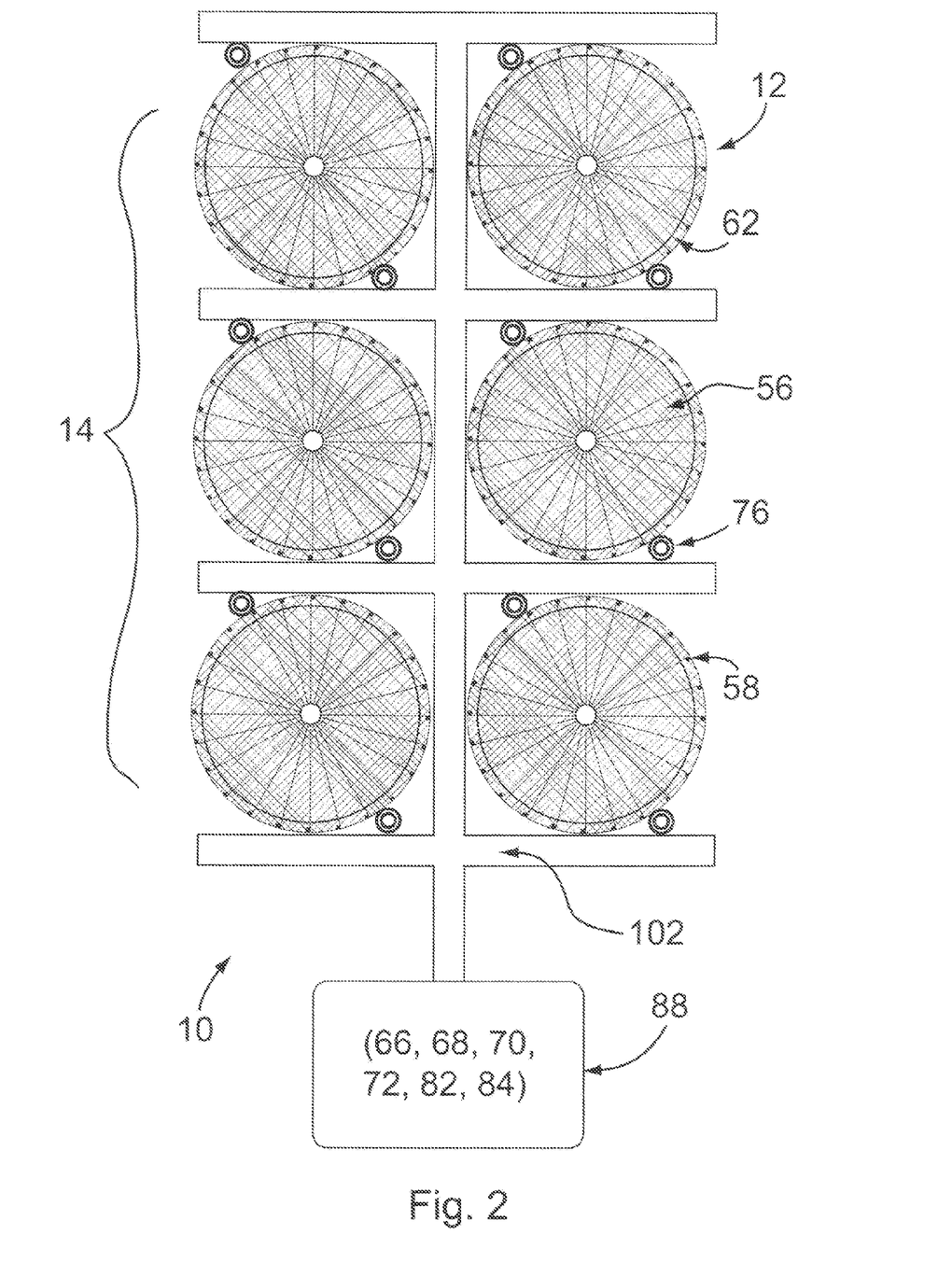
FIG. 2 is a top down view of an array of tanks and the system used in the present invention.

Referring to FIG. 2, a commercially and ecologically sustainable aquaculture system would comprise a closed containment fish rearing system 10 with a plurality of tanks (such as at 12, with its walkway 62). Each tank is of substantially cylindrical shape, for structural strength and maximizing internal volume while providing structural strength and an efficiently shape for internal water movement to exercise fish and separate detritus through centrifugal effect. The tank array 14 shows each tank having dual pumps (such as at 76), on opposite sides of each tank (rather than more adjacent to one another as in FIG. 1), for balancing of the load on each pump and to assist with the symmetry of the vortex of water circulation. The netting (such as at 56) attached to netting stays (such as at 58) on each tank keeps predatory birds from reaching the fish being reared. The wharf 102 enables ready access by workers to all the tanks. A control building 88 contains the power supply 66, the diesel backup 68, the oxygen supply 70, the liquid oxygen backup 72, the waste filtration system, 82, and the monitoring system 84.

Figure 3:
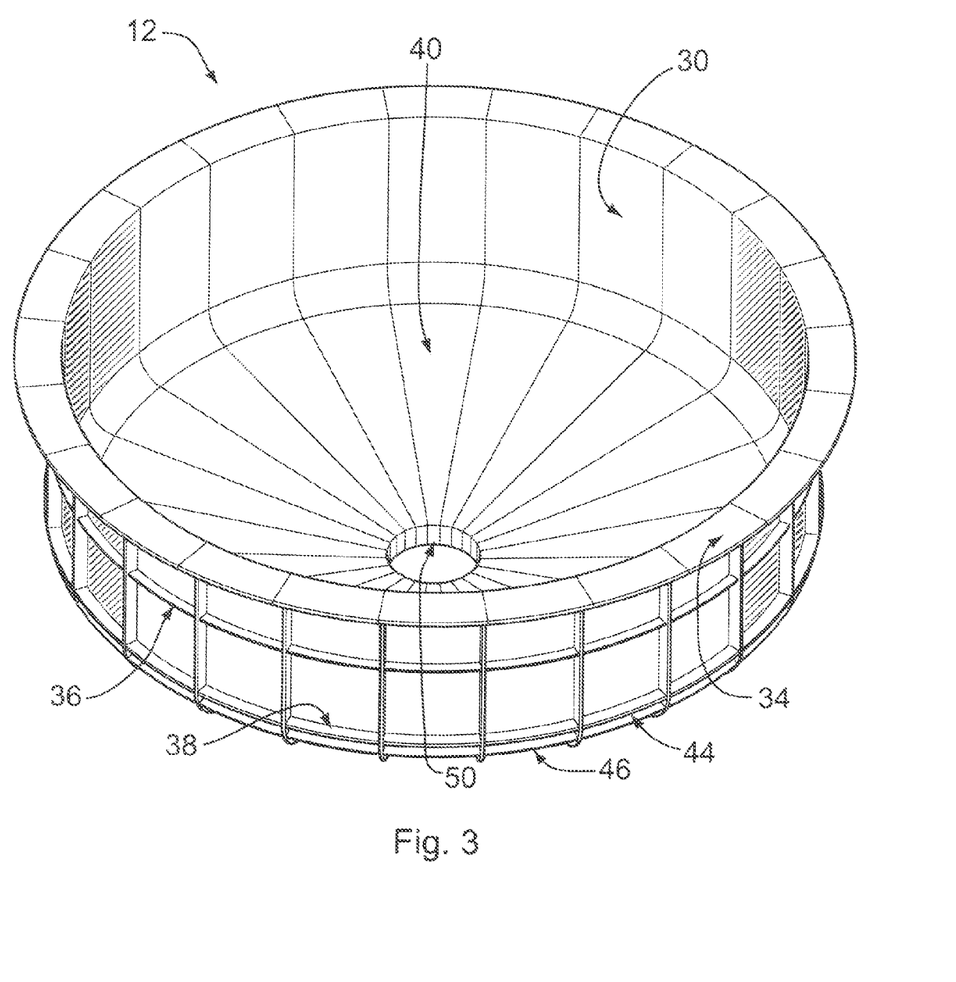
FIG. 3 is a perspective view of a constructed tank of the present invention.

Referring to FIG. 3, the tank 12 comprises sidewall panels (such as at 30) joined to bottom panels (such as at 40) The panels are curved the junction of sidewall panel to bottom panel, for seamless strength along this transition area, and to facilitate smooth hydrodynamic flow of seawater both around the outside of the tank and on the inside of the tank. The inside water will be circulated to exercise the fish that are being reared and to provide a optimum environment for the husbandry of the fish by means detailed in FIGS. 9 and 10. Lateral strength is increased by the sidewall mid ribs (such as at 36), the sidewall interface flange (such as at 38), The sidewall panels are joined to the bottom panels by the bottom interface flanges (such as at 44). Bottom secondary ribs (such as at 46) provide additional strength to the tank 12 at the curved area of the bottom panel adjacent to hat joining. The sidewall upper walkway 34 is integral to the tank 12. The central bottom trap flange 50 is where debris and feces will be collected.

Figure 4:
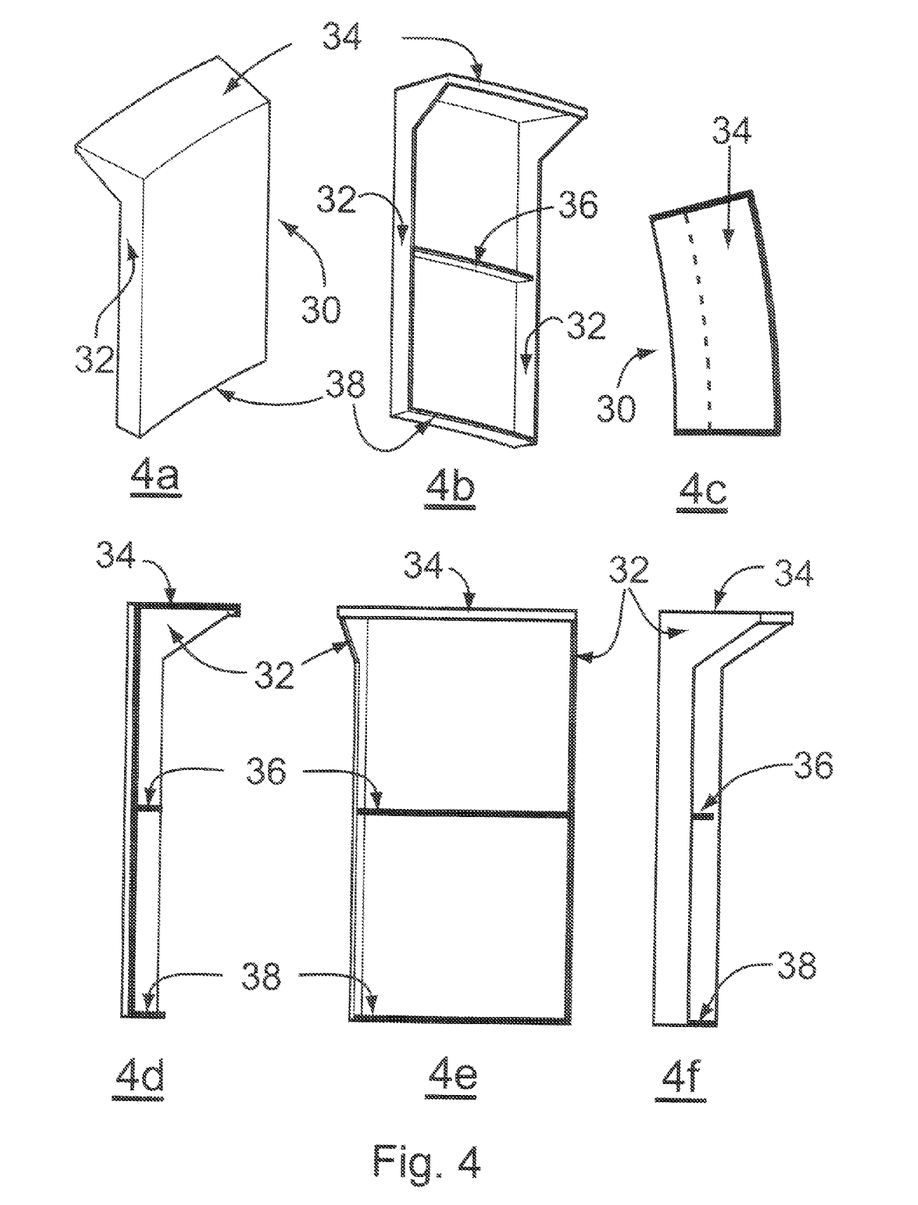
FIG. 4 is a perspective view of a partially constructed tank featured in the present invention.

Referring to FIG. 4 a sidewall panel 30 of a tank is shown in perspective from the inside (FIG. 4a), outside (FIG. 4b) and top (FIG. 4c). A side view is shown in FIG. 4d, an outside front view in FIG. 4e, and a side perspective in 4f. Each sidewall strut flange 32 is joined perpendicular to the sidewall upper walkway 34, to the sidewall mid rib 36.

Figure 5:
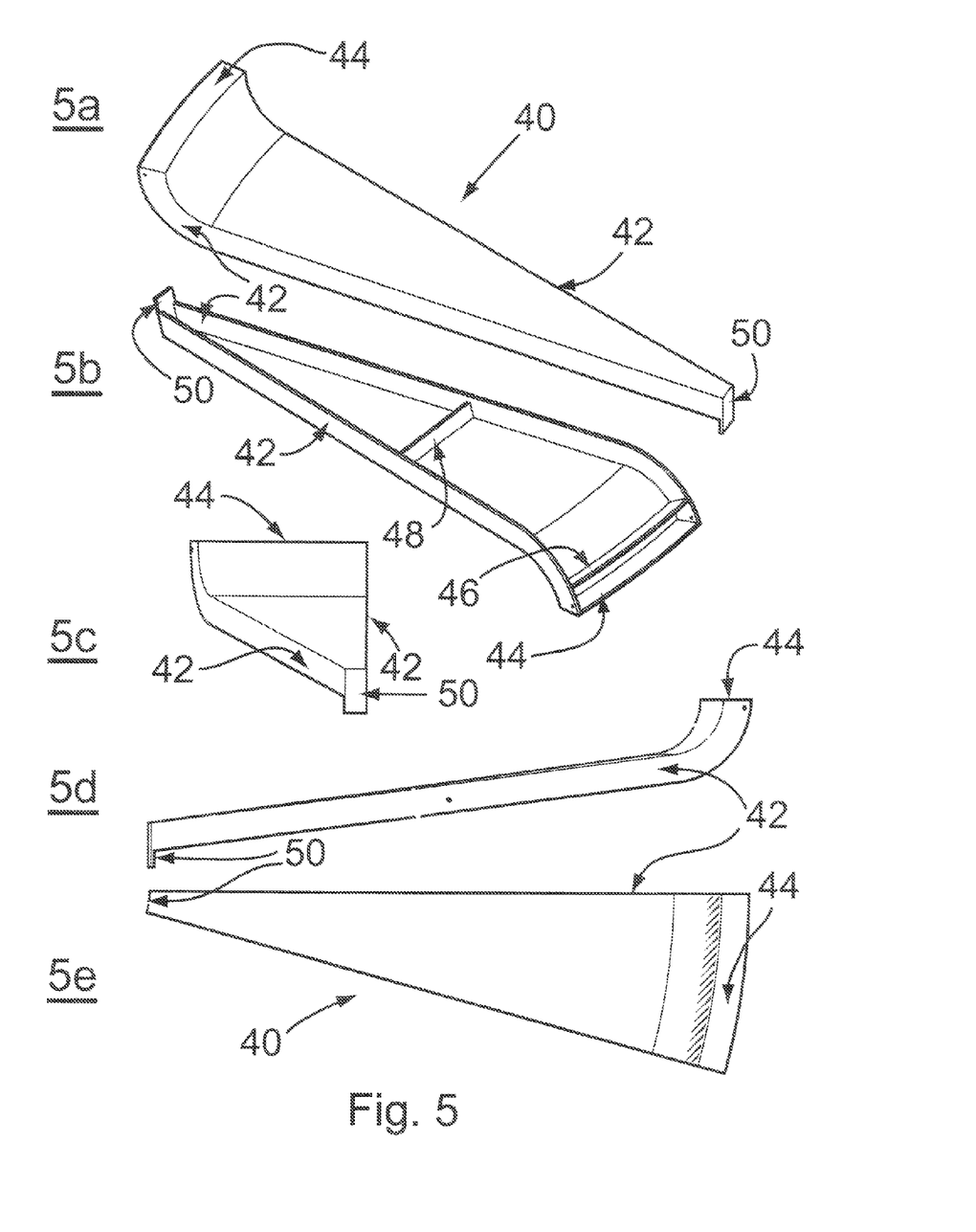
FIG. 5 is a side cross-sectional view of one of the panels used in the present invention showing the layers of laminate material and foam.
Figure 6:
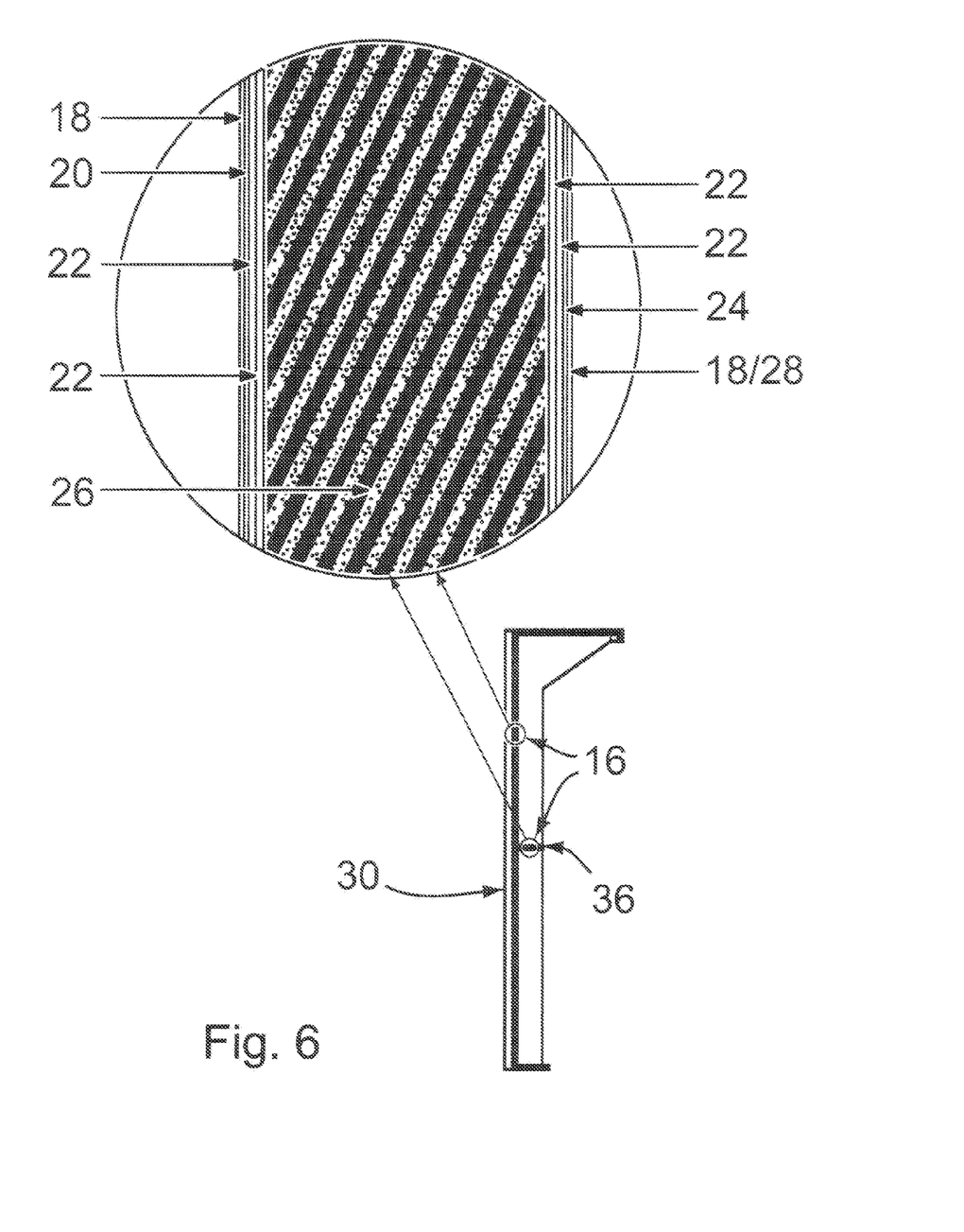
FIG. 6 is a side cross-sectional view of one of the struts used in the present invention showing the layers of laminate material and foam.

Referring to FIG. 5, the bottom panels such as 40 are tapered form a cone around the central bottom trap flange 50. A top and side perspective of a bottom panel is shown at FIG. 5a, a bottom and side perspective at 5b, a top perspective from the central bottom flange at 5c, a side perspective at 5d, and a top perspective at 5e. 1 Bottom strut flanges 42 provide bottom strength and are used to join the bottom panels to each other. The sidewall panels are joined to the bottom panels by the bottom interface flanges (such as at 44). Bottom secondary ribs (such as at 46) provide additional strength at the curved area of the bottom panel adjacent to hat joining Referring to FIG. 6, a composite 16 is used for the sidewall panel 30 and the ribs and flanges such as the sidewall mid rib 36. The sidewall panel is finished on the inside with a gelcoat 18 for durability in the marine environment for the fish. Underneath the gelcoat is a skincoat 20, covering multiple fiberglass structural layers 22 over a structural foam core 26. The outside of the sidewall panel 30 is likewise made of multiple layers of fiberglass structural layers 22 under a fiberglass surface layer 24 for resistance to extremes of current, wave, and weather against the outside of the tank. In lieu of or in addition to a outer gelcoat 18, the fiberglass surface layer 24 can be covered with an epoxy paint 28 for enhanced resistance to harsh marine environment elements.

Figure 7:
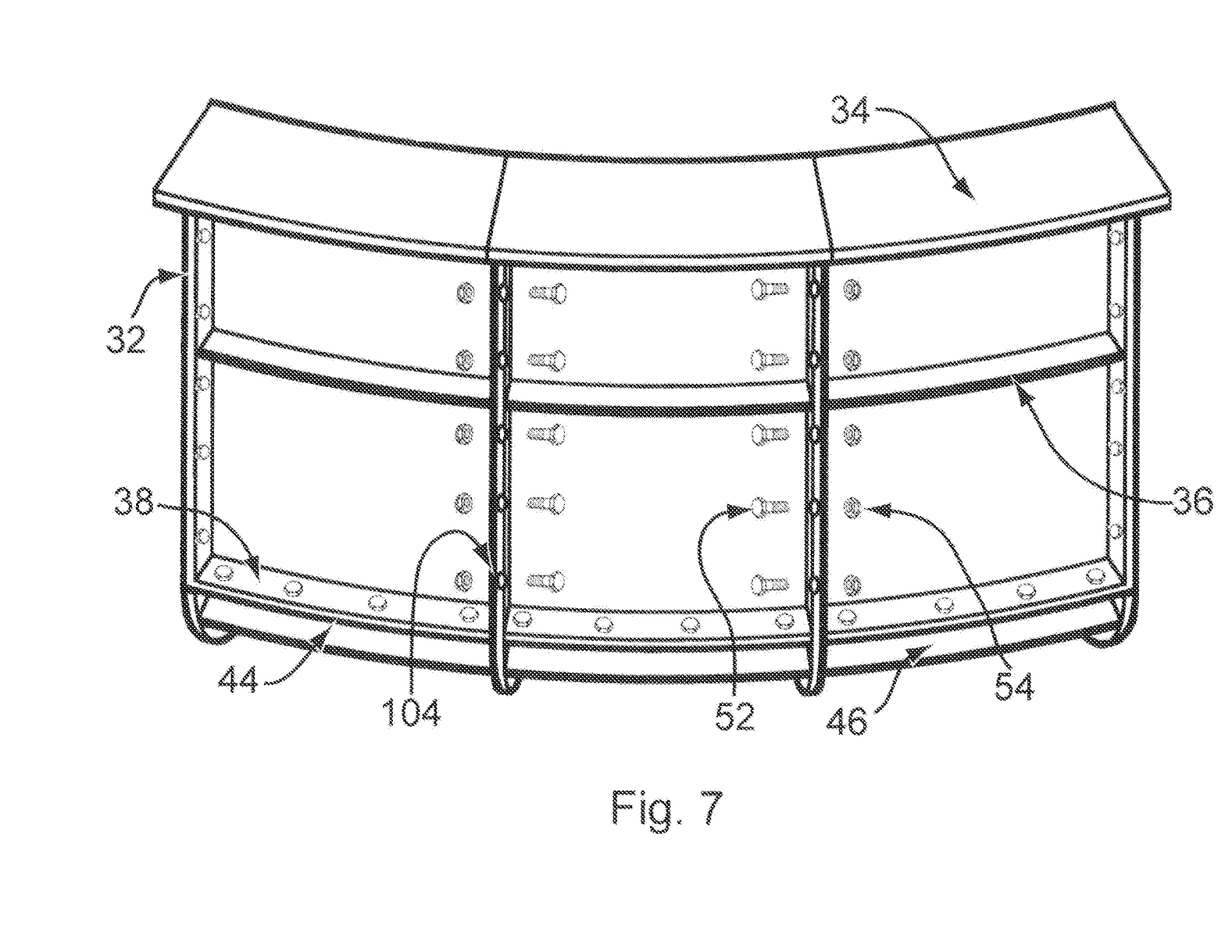
FIG. 7 is a detail view showing how the panels are attached between the struts in forming the tank.

Referring to FIG. 7, the sidewall strut flanges (such as 32) are affixed to each other by means of flange bolts (securement) as at 52 and flange nuts as at 54. thereby aligning horizontally the sections of sidewall upper walkway 34, the sidewall mid ribs as at 36, the bottom interface flanges as at 44, and the bottom secondary flanges as at 46.

Figure 8:
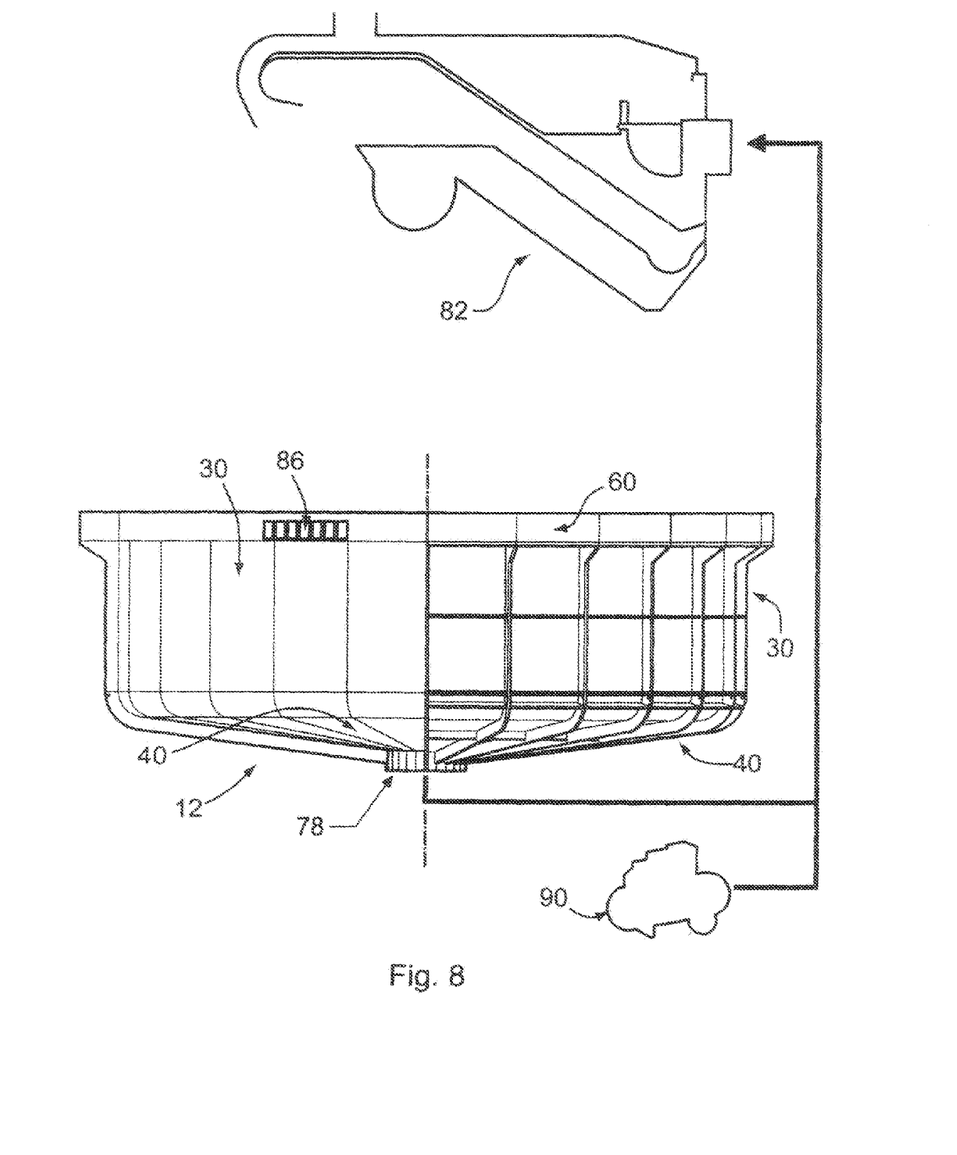
FIG. 8 is a side cross-sectional view of the tank, showing the central bottom filter outlet.

Referring to FIG. 8, at the top of the sidewall panels 30 of the tank 12 a walkway side 60 is used to support netting stays, such as at 58 in FIG. 2. Overflow outlets such as 86 are provided. The control building (88 in FIG. 2) can contain an air compressor (90 in FIG. 8) to pressurize and move waste in the waste filtration system 82 connected to the waste outlet 78 at the center of the bottom panels 40. Excess food, food, excrement, and dead fish are thereby caught and processed for land-based recycling as crop fertilizer.

Figure 9:
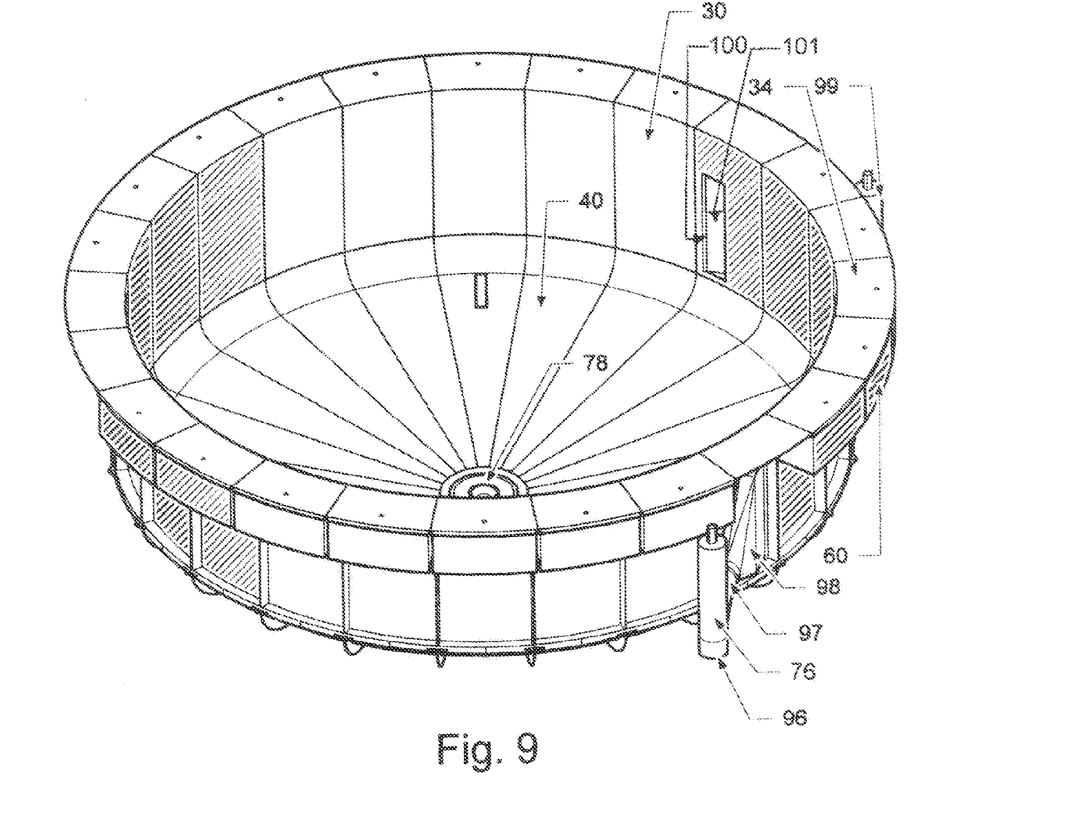
FIG. 9 is a top side perspective of the tank, with pumps connected to water inlet windows.

Referring to FIG. 9, a first pump 95 has a marine-based water inlet 96 and a pump water outlet 97 that is connected to a flared tank inlet pipe 98, located below the sidewall upper walkway 34. The tank inlet pipe 98 starts in a cylindrical shape connected to the pump's water outlet 97 but is flared into a rectangular opening that is sealed to the frame of a rectangular water inlet window, such as is shown at 100 for a second pump 99. An interior wall 101 of a like flared tank inlet pipe for the second pump 99 is shown abutting the rectangular water inlet window frame 100. The direction of water flow from each pump's water outlet to its respective water inlet window for the tank is at an acute angle to the side wall of the tank, causing water to be pushed circularly within the tank. For example, with the pumps connected as shown, water will flow into the tank from water inlet window 100 and a like window for the first pump 95 such that the water flow within the tank will circulate counterclockwise when viewed from the top of the tank. Some of the water pumped into the tank will exit at the waste trap 78 at the center of the tapered bottom panels (one such panel is marked 40).

Figure 10:
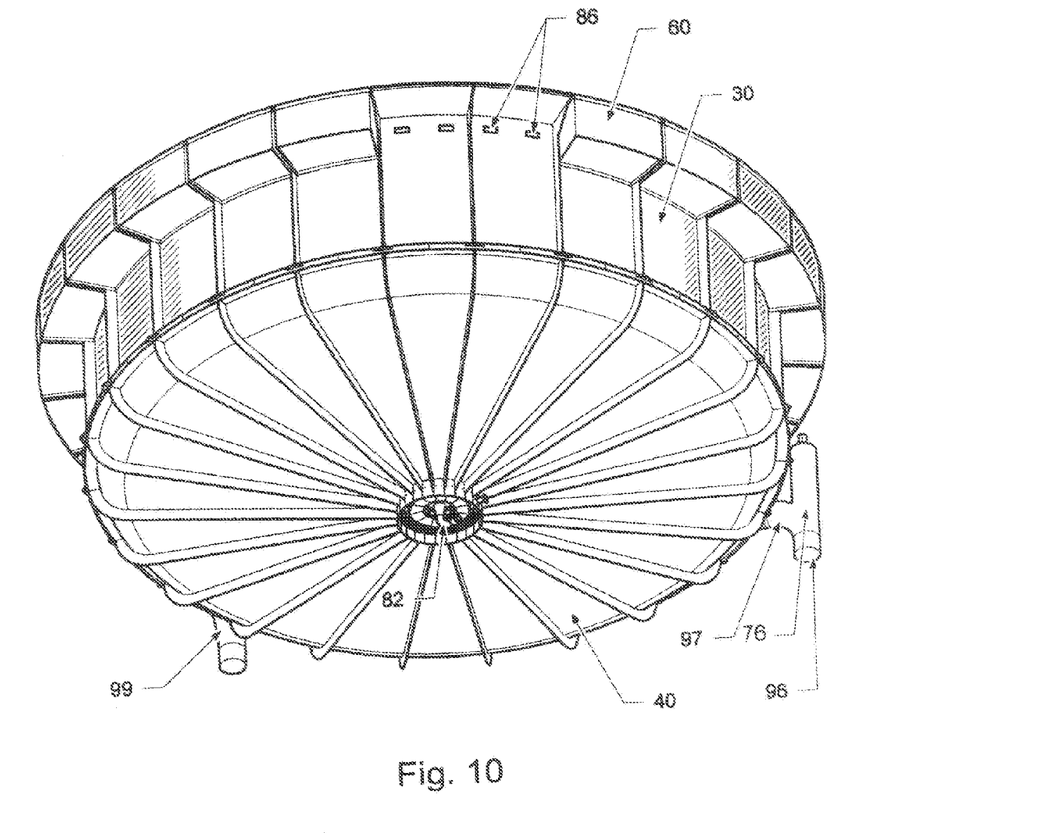
FIG. 10 is a bottom side perspective of the tank, showing its pumps and central bottom filter outlet.

Referring to FIG. 10, more of the water pumped into the tank by the pumps 96 and 99 will exit through the overflow outlets 86. The water inlet 96 for the first pump 95 and its outlet 97 may be connected to a water intake as shown at 74 in FIG. 1 in order to pump in water from a cooler depth of water below the tank. At the center of the tapered bottom panels (one of which is marked at 40), a waste outlet 80 (shorter than as shown in FIG. 1) enables connection to the waste filtration system (82 in FIGS. 1, 2 and 8).

Other variants and enhancements to the system as specified above are possible without departing from the essence of the invention, which is not limited by the examples given above, the invention and the breadth of exclusive rights therein being defined by the appended Claims.

I claim:

1. A solid wall closed-containment system for cultivating aquatic species, comprising floatation panels having a side portion that curves into a bottom portion, fitted between flanged struts and arranged to provide a continuous side wall contiguous with a continuous bottom to separate outside water and organisms from inside water and contained aquatic species, forming a tank that is substantially cylindrical in shape, with solid sides and bottom, made up of a plurality of side and bottom flotation panels having curved portions between side portions and bottom portions of each flotation panel, comprising at least one water pump mounted outside the tank and having a pump water outlet connected to a flared pipe that is sealed at an acute angle to a tank water inlet window in a side panel of the tank, to circulate water within the tank.

2. The solid wall closed-containment system of claim 1, in which the side portion is curved vertically and forms an arc, such that a plurality of such side portions can be arranged to form a tank that is substantially cylindrical.

3. The solid wall closed containment system of claim 2, in which:
   a) the bottom portion is tapered toward a central drain abutment end and has a substantially conical portion, such that a plurality of such bottom portion can be arranged to form a tank having a bottom that is substantially conical and surrounds a drain aperture;
   b) the floatation panels comprise floatation layers laminated with waterproof layers;
   c) there is additionally a power system, an oxygenation system, a waste removal system, and a computerized husbandry monitoring system, with sensors and electronic controls for water temperature, flow, and quality;
   d) there are at least two water pumps which have marine based water intakes, and which circulate water within the tank; and
   e) there is a waste trap at a central bottom portion of the tank which collects solid matter and sludge for removal to a waste separation system.

4. The solid wall closed-containment system of claim 1, in which the bottom portion is tapered toward a central drain abutment end and has a substantially shallow cone portion, such that a plurality of such bottom portions can be arranged to form a tank having a bottom that is substantially conical and surrounds a drain aperture.

5. The solid wall closed-containment system of claim 1, in which the floatation panels comprise floatation layers laminated with waterproof layers.

6. The solid wall closed-containment system of claim 1, in which the flanged struts comprise floatation layers laminated with waterproof layers.

7. The solid wall closed-containment system of claim 1, comprising additionally a power system, an oxygenation system, and a waste removal system.

8. The solid wall closed-containment system of claim 1, comprising additionally a computerized husbandry monitoring system, with sensors and electronic controls for water temperature, flow, and quality.

9. The solid wall closed-containment system of claim 1, comprising at least two water pumps which have marine based water intakes, and which circulate water within the tank.

10. The solid wall closed-containment system of claim 1, in which there is a waste trap at a central bottom portion of a tank formed by the flotation panels and flanged struts, to collect solid matter and sludge for removal to a waste separation system.

* * * * *